(12) United States Patent
Choi et al.

(10) Patent No.: US 7,573,552 B2
(45) Date of Patent: Aug. 11, 2009

(54) TRANSFLECTIVE LIQUID CRYSTAL DISPLAY DEVICE AND METHOD OF FABRICATING THE SAME

(75) Inventors: Yoon-Seok Choi, Suwon-si (KR); Young-Jin Chang, Yongin-si (KR); Jae-Beom Choi, Suwon-si (KR); Seung-Hwan Shim, Seongnam-si (KR); Han-Na Jo, Cheongju-si (KR)

(73) Assignee: Samsung Electronics, Co., Ltd., Suwon-si, Gyeonggi-do (KR)

( * ) Notice: Subject to any disclaimer, the term of this patent is extended or adjusted under 35 U.S.C. 154(b) by 97 days.

(21) Appl. No.: 11/925,487

(22) Filed: Oct. 26, 2007

(65) Prior Publication Data

US 2008/0100782 A1    May 1, 2008

(30) Foreign Application Priority Data

Oct. 27, 2006    (KR)    ...................... 10-2006-0104904

(51) Int. Cl.
*G02F 1/1335*    (2006.01)
(52) U.S. Cl. ...................................... 349/117
(58) Field of Classification Search .................. 349/117
See application file for complete search history.

(56) References Cited

U.S. PATENT DOCUMENTS 7,474,367 B2 *    1/2009    Ozawa et al. ............... 349/114

FOREIGN PATENT DOCUMENTS

| JP | 2002-169147 | 6/2002 |
|---|---|---|
| KR | 10-2005-0026577 | 3/2005 |
| KR | 10-2006-0007097 | 1/2006 |

OTHER PUBLICATIONS

English Abstract for Publication No. 2002-169147.
English Abstract for Publication No. 10-2005-0026577.
English Abstract for Publication No. 10-2006-0007097.

* cited by examiner

*Primary Examiner*—David Nelms
*Assistant Examiner*—Phu Vu
(74) *Attorney, Agent, or Firm*—F. Chau & Associates, LLC (57) ABSTRACT

A transflective liquid crystal display device has improved light efficiency. A method of fabricating a transflective liquid crystal display device including a thin film transistor substrate having a transmissive region and a reflective region, includes forming a retardation layer on a lower surface of the thin film transistor substrate, aligning a mask having a reflective region pattern on the lower surface of the thin film transistor substrate, and forming a light efficiency enhancer by selectively removing the retardation layer by irradiating a laser onto the lower surface of the thin film transistor substrate through the mask.

14 Claims, 6 Drawing Sheets

TRANSFLECTIVE LIQUID CRYSTAL DISPLAY DEVICE AND METHOD OF FABRICATING THE SAME

CROSS-REFERENCE TO RELATED PATENT APPLICATION

This application claims priority from Korean Patent Application No. 2006-0104904, filed Oct. 27, 2006, the contents of which are herein incorporated by reference in their entirety.

BACKGROUND OF THE INVENTION

1. Field of the Invention

The present disclosure is directed to a transflective liquid crystal display devices that are capable of improving light efficiency and methods of fabricating the same.

2. Description of the Related Art

Liquid crystal display ("LCD") devices control light transmission characteristics of liquid crystal materials with electric fields to display pictures. An LCD device has an LCD panel having a sandwich-like structure with liquid crystal molecules interposed between two substrates. In VA (Vertical Alignment) mode, two substrates have electrodes facing each other. The liquid crystal molecules are rotated by an electric field generated when a voltage is applied across the electrodes.

An LCD device requires a light source and is broadly classified into a transmissive type and a reflective type, depending on which light source is used.

A transmissive LCD device displays images by using light emitted from a backlight lamp positioned at the rear of the LCD panel. On the other hand, a reflective LCD device uses ambient light, such as external illumination or sunlight.

The transmissive LCD device is useful in dark environments since a backlight lamp is provided, however, it consumes a large amount of power. On the other hand, the reflective LCD device using ambient light has low power consumption, but viewing is difficult in dark rooms or at night.

A transflective LCD device is useful in both bright and dark environments. The transflective LCD device operates as the transmissive LCD device using the backlight lamp in a bright ambient light environment and operates as the reflective LCD device in a dark ambient light environment.

Figure 1:
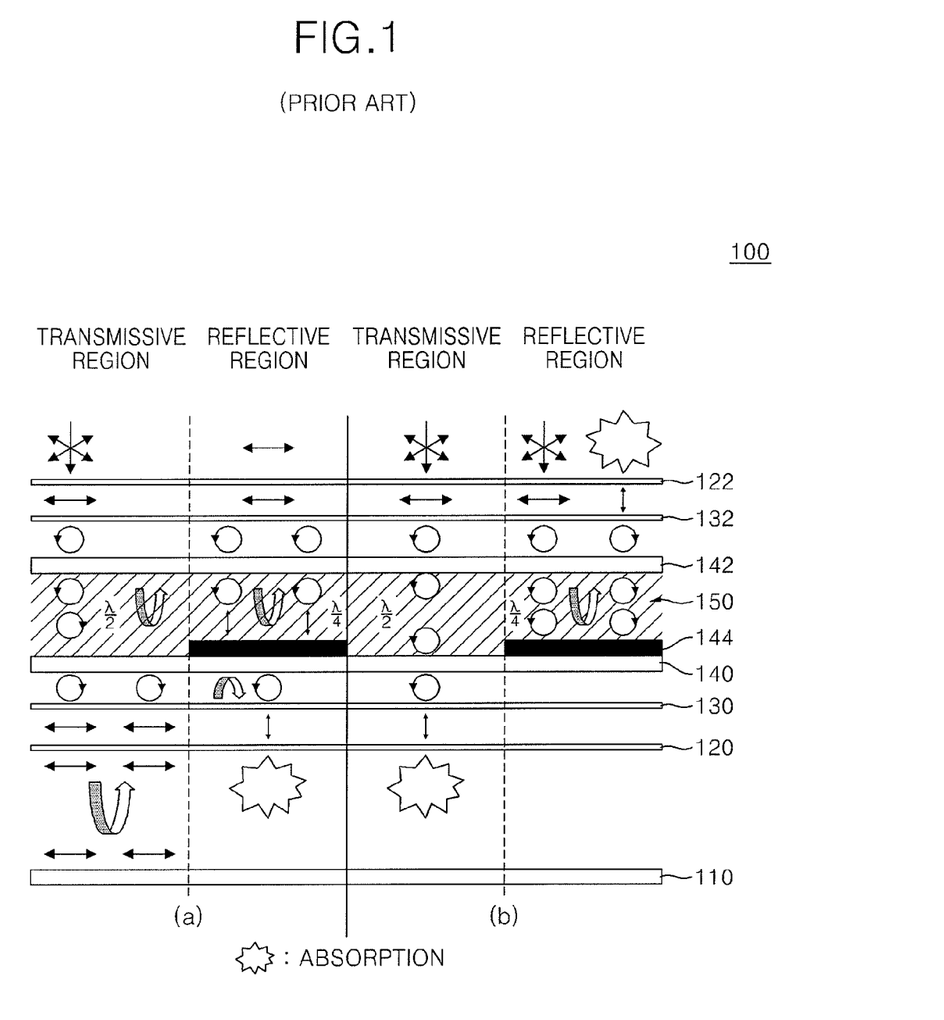
FIG. 1 is a partial cross sectional view illustrating an operation of a conventional transflective LCD device in a reflective mode.
Figure 2:
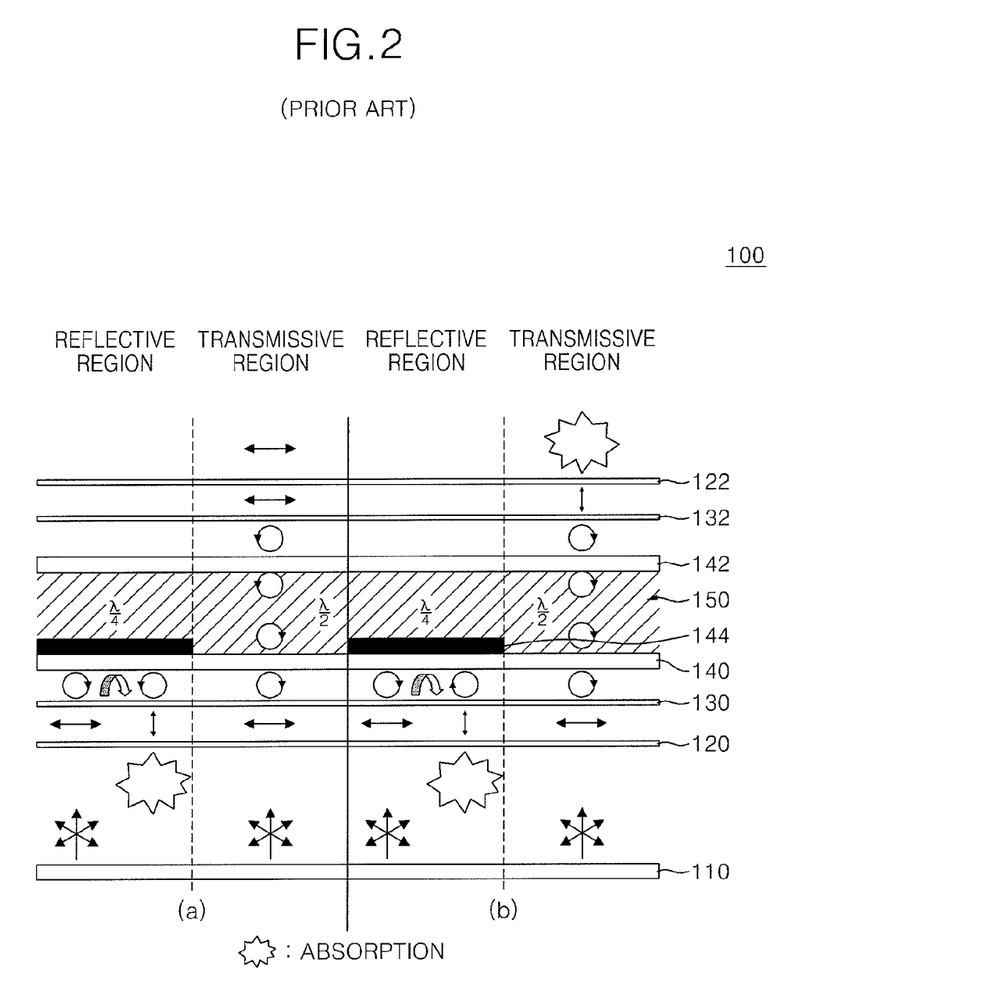
FIG. 2 is a partial cross sectional view illustrating an operation of the conventional transflective LCD device in a transmissive mode.

FIGS. 1 and 2 are partial cross sectional views illustrating a conventional transflective LCD device operating in a reflective mode and in a transmissive mode, respectively.

In FIGS. 1 and 2, left parts (a) of an LCD device 100 show an operation of the LCD device 100 when a driving voltage is not applied to a liquid crystal layer, and right parts (b) of LCD device 100 show an operation of the LCD device 100 when the driving voltage is applied to the liquid crystal layer.

The conventional transflective LCD device 100 is constructed such that a transmissive region and a reflective region are provided in a unit pixel. The transflective LCD device 100 includes a backlight reflector 110, a lower polarization layer 120, a lower retardation plate 130, a lower glass substrate 140 on which a reflector 144 is formed, a liquid crystal layer 150, an upper glass substrate 142, an upper retardation plate 132, an upper polarization layer 122, and a backlight lamp (not shown).

When the transflective LCD device 100 operates in a reflective mode, external light entered to a reflective region is reflected by the reflector 144 toward a front viewing direction. The external light entered to a transmissive region is reflected by the backlight reflector 110. Thereafter, a large quantity of the reflected light is further reflected by the reflector 144 and then blocked by the lower polarization layer 120, resulting in degradation of the light efficiency. When the transflective LCD device 100 operates in a transmissive mode, light from the backlight lamp is transmitted toward a front viewing direction of a transmissive region. However, light reflected by the reflector 144 at the reflective area is blocked by the lower polarization layer 120, resulting in degradation of the light efficiency. The lowered light efficiency deteriorates the transmissive luminance and reflectivity of the LCD device.

SUMMARY OF THE INVENTION

An aspect of the present invention provides a transflective LCD device that is capable of improving transmissive luminance and reflectivity and a method of fabricating the transflective LCD device.

According to an exemplary embodiment of the present invention, a method of fabricating a transflective liquid crystal display device including a thin film transistor substrate having a transmissive region and a reflective region includes forming a retardation layer on a lower surface of the thin film transistor substrate, aligning a mask having a reflective region pattern on the lower surface of the thin film transistor substrate, and forming a light efficiency enhancer by selectively removing the retardation layer by irradiating a laser onto the lower surface of the thin film transistor substrate through the mask.

The retardation layer has a $\lambda/4$ phase retardation characteristic.

The mask is aligned using an alignment key formed of a gate pattern.

The mask has the reflective region pattern blocking the laser at an area corresponding to the reflective region and transmitting the laser at an area corresponding to the transmissive region.

The laser is a krypton fluoride (KrF) laser or an argon fluoride (ArF) laser.

According to another exemplary embodiment of the present invention, a method of fabricating a transflective liquid crystal display device including a thin film transistor substrate having a transmissive region and a reflective region includes coating an optical alignment compound on a lower surface of the thin film transistor substrate, forming an optical alignment layer by optically aligning the optical alignment compound at the reflective region, coating a photo-polymerizable reactive liquid crystal reacting to an ultraviolet light on the optical alignment layer, and forming a light efficiency enhancer by hardening the liquid crystal.

The optical alignment compound is a polyimide polymer compound.

The forming of an optical alignment layer includes aligning a mask having a reflective region pattern on the optical alignment compound, aligning a linear polarizer on the mask, and projecting an ultraviolet light onto the optical alignment compound through the linear polarizer and the mask.

The mask exposes the optical alignment compound to the ultraviolet light at the reflective region and blocks the ultraviolet light at the transmissive region.

The liquid crystal layer is horizontally aligned to retard a phase of light by $\lambda/4$ at the reflective region.

The photo-polymerizable reactive liquid crystal is coated using a spin coating technique or a printing technique.

The light efficiency enhancer is formed by hardening the photo-polymerizable reactive liquid crystal while liquid crystal molecules are aligned in accordance with the optical alignment layer.

According to another exemplary embodiment of the present invention, a transflective liquid crystal display device including a thin film transistor substrate having a transmissive region and a reflective region includes lower and upper polarization layers each having a horizontal optical axis, a backlight reflector for reflecting incident light to the lower polarization layer, lower and upper retardation plates positioned between the lower and upper polarization layers, each retarding a phase of incident light by $\lambda/4$, lower and upper glass substrates positioned between the lower and upper retardation plates, wherein the lower and upper glass substrates are assembled while maintaining a gap, a liquid crystal layer disposed in the gap to adjust transmissivity of passing light, a reflector formed on the lower glass substrate at the reflective region, and a light efficiency enhancer formed between the lower glass substrate and the lower retardation plate to retard the phase of the light by $\lambda/4$.

The light efficiency enhancer is formed at the reflective region not at the transmissive region.

BRIEF DESCRIPTION OF THE DRAWINGS

The exemplary embodiments of the present invention will now be described with reference to the attached drawings.

DETAILED DESCRIPTION OF EXEMPLARY EMBODIMENTS

Figure 3:
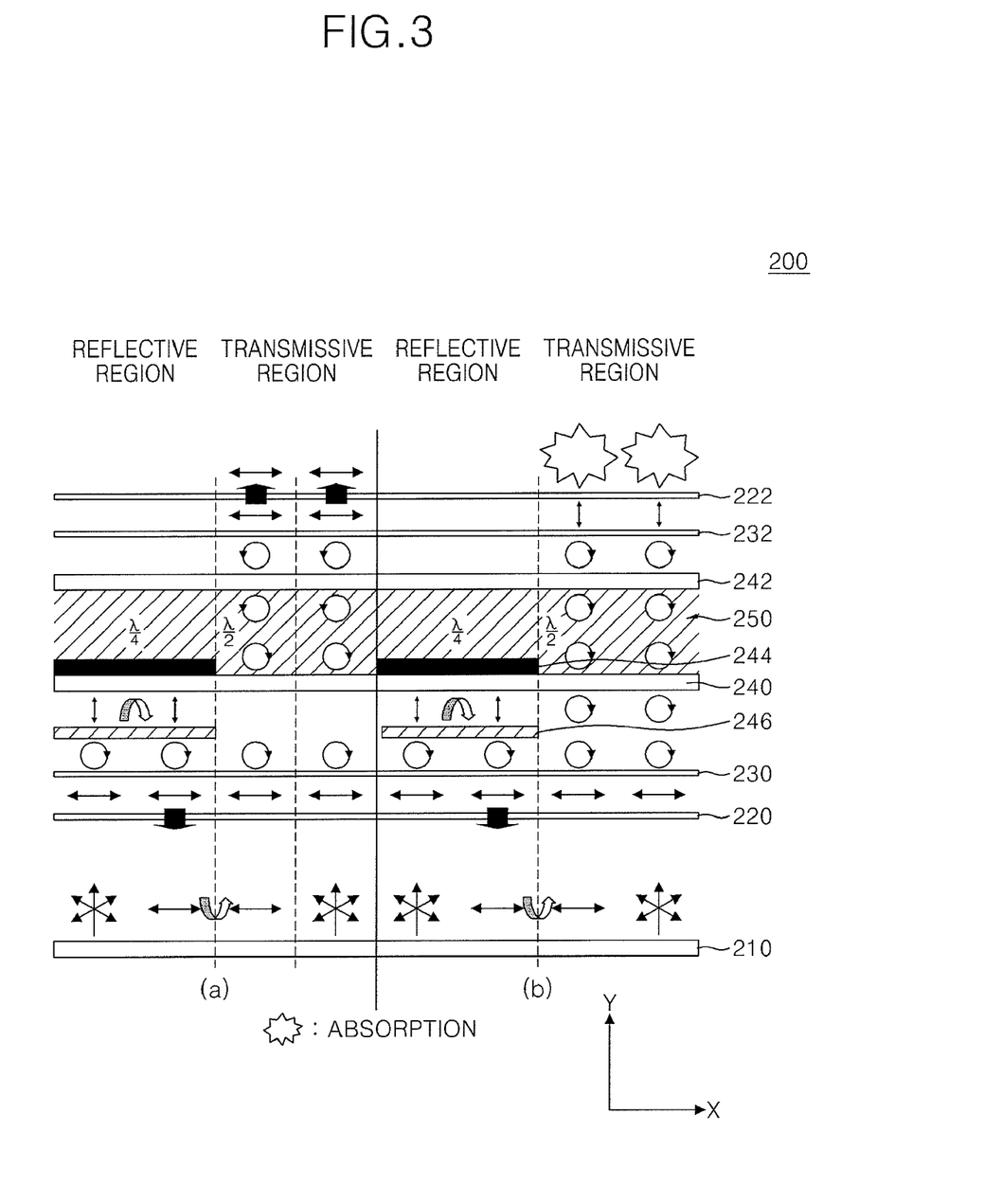
FIG. 3 is a partial cross sectional view illustrating an operation of a transflective LCD device in a transmissive mode according to an exemplary embodiment of the present invention.

FIG. 3 is a partial cross sectional view illustrating an operation of a transflective LCD device in a transmissive mode according to an exemplary embodiment of the present invention.

Referring to FIG. 3, a transflective LCD device 200 is constructed such that a transmissive region and a reflective region are provided in a unit pixel. The transflective LCD device 200 includes a backlight reflector 210, a lower polarization layer 220, a lower retardation plate 230, a lower glass substrate 240, a liquid crystal layer 250, an upper glass substrate 242, an upper retardation plate 232, an upper polarization layer 222, and a backlight lamp (not shown).

The lower glass substrate 240 further includes a thin film transistor array (not shown), a reflector 244, and a light efficiency enhancer 246; and the upper glass substrate 242 further includes a color filter (now shown).

The reflector 244 reflects light and is formed on upper surface of the lower glass substrate 240 at the reflective region.

The light efficiency enhancer 246 retards the phase of incident light by $\lambda/4$.

The light efficiency enhancer 246 may be made of a polymer such as polycarbonate, polyvinyl alcohol, polystyrene, polymethyl methacrylate, polypropylene, polyolefine, or polyacrylate. The light efficiency enhancer 246 may be made of a polyamide polymer compound. The light efficiency enhancer 246 is formed below the lower glass substrate 240 at the reflective region.

A part (a) of the transflective LCD device 200 shows a white state when a driving voltage is not applied to the liquid crystal layer, and a part (b) of the transflective LCD device 200 shows a black state when the driving voltage is applied to the liquid crystal layer.

When the driving voltage is not applied to the liquid crystal layer as shown in part (a), the phase of light passing through the liquid crystal layer 250 is retarded by $\lambda/2$ at the transmissive region. When the driving voltage is applied to the liquid crystal layer as shown in part (b), the phase of light passing through the liquid crystal layer 250 is not retarded at the transmissive region. In the transmissive mode, the external light is not considered.

The light recycling process of the above-structured transflective LCD device 200 is described herein after.

Light emitted from the backlight lamp (not shown) at the reflective region is linearly polarized along the X axis while passing through the lower polarization layer 220 and then retarded by $\lambda/4$ while passing through the lower retardation plate 230 to be left-hand circularly polarized light. Next, the left-hand circularly polarized light is retarded by $\lambda/4$ while passing through the light efficiency enhancer 246 to be linearly polarized along the Y axis The linearly polarized light along the Y axis is reflected by the reflector 244 and then retarded by $\lambda/4$ while passing through the light efficiency enhancer 246 to be left-hand circularly polarized light.

The left-hand circularly polarized light is retarded by $\lambda/4$ while passing through the lower retardation plate 230 to be linearly polarized light along the X axis.

Since the lower polarization layer 220 has a X directional optical axis, the linearly polarized light along the X axis almost passes through the lower polarization plate 220 without loss and then is reflected by the backlight reflector 210 to be emitted to the transmissive region.

Unlike the conventional transflective LCD device, the light reflected by bottom of the reflector 244 almost passes through the lower polarization plate 220 without loss so that the reflected light can be reused in transmissive region, thereby improving the light efficiency. Accordingly, it is possible to improve the transmissive luminance and reflectivity of the LCD device.

Figure 4:
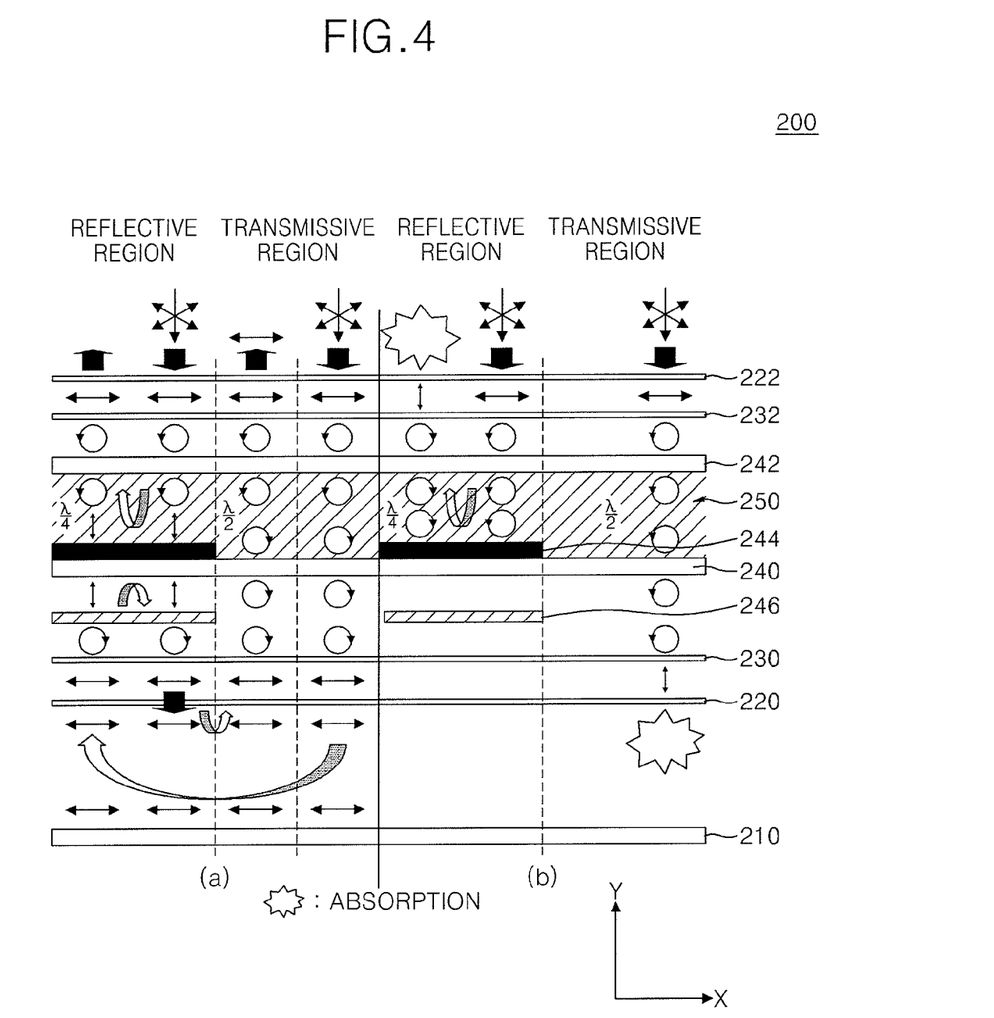
FIG. 4 is a partial cross sectional view illustrating an operation of a transflective LCD device in a reflective mode according an exemplary embodiment of the present invention.

FIG. 4 is a partial cross sectional view illustrating an operation of a transflective LCD device in a reflective mode according an exemplary embodiment of the present invention.

A Part (a) of the transflective LCD device 200 shows a white state when the driving voltage is not applied to the liquid crystal layer, and part (b) of the transflective LCD device 200 shows a black state when the driving voltage is applied to the liquid crystal layer.

When the driving voltage is not applied to the liquid crystal layer 250 as shown in part (a), the phase of light passing through the liquid crystal layer 250 is retarded by $\lambda/4$ at the reflective region and retarded by $\lambda/2$ at the transmissive region, when the driving voltage is not applied to the liquid crystal as shown in part (b), the phase of light passing through the liquid crystal layer 250 is not retarded at the reflective region and the transmissive region.

Except the external light is used in the reflective mode, the light recycling process is same with the transmissive mode.

Figure 5:
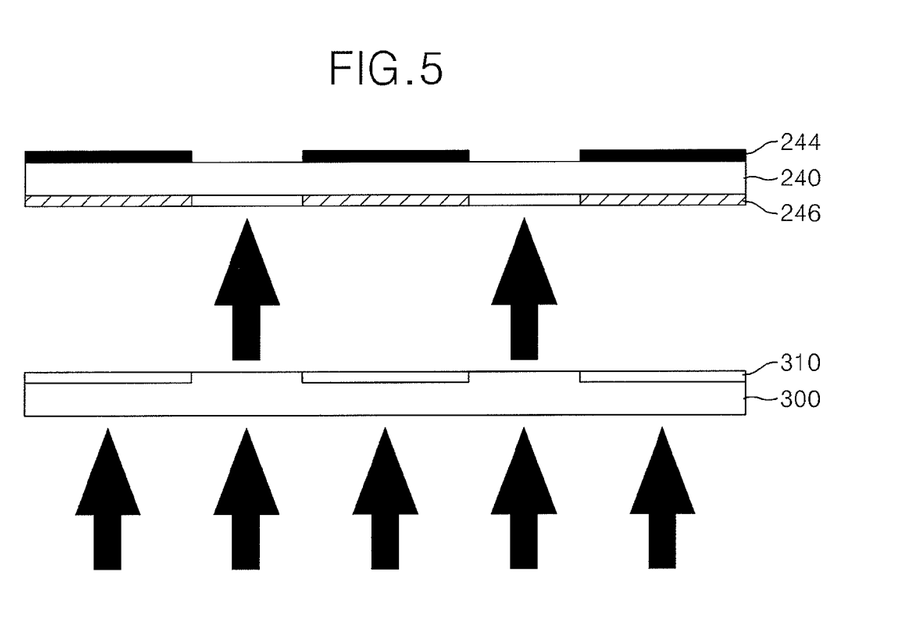
FIG. 5 is a schematic view illustrating a method of forming a light efficiency enhancer of FIG. 3 according to an exemplary embodiment of the present invention.

FIG. 5 is a schematic view illustrating a method of forming the light efficiency enhancer of the transflective LCD device of FIG. 3, according to an exemplary embodiment of the present invention.

In a method of fabricating the transflective LCD device according to an exemplary embodiment of the present invention, the light efficiency enhancer 246 is formed on the lower glass substrate 240 using a laser patterning technique.

Referring to FIG. 5, the light efficiency enhancer 246 is formed by coating a λ/4 retardation layer on the lower surface of the lower glass substrate 240 and selectively removing the λ/4 retardation layer through a photolithography process or the like, after forming the reflector 244 on an upper surface of the lower glass substrate 240.

In more detail, after the λ/4 retardation layer is formed on the lower surface of the lower glass substrate 240, a mask 300 having a reflective region pattern 310 is aligned below the lower glass substrate 240 such that the mask 300 faces the λ/4 retardation layer using an alignment key. After the mask 300 is aligned, laser light is projected onto the mask 300. The reflective region pattern 310 of the mask 300 blocks the laser light. The λ/4 retardation layer corresponding to a transmissive region is removed by irradiating the laser light and the remaining portion of the λ/4 retardation layer becomes the light efficiency enhancer 246.

The reflective region pattern 310 of the mask corresponds to a reflective region of the transflective LCD device, and the alignment key may be formed of a gate pattern. The laser is projected in a scanning technique according to the size of a laser beam.

The above-described process of forming the light efficiency enhancer 246 may be performed after finishing rubbing process of alignment layer on the lower glass substrate and before assembling the upper and lower glass substrates, because the λ/4 phase retardation layer is likely to be damaged by the high temperature of rubbing process and liquid crystal molecules and thin film transistor are likely to be damaged by the laser. On the other hand, the process of forming the light efficiency enhancer 246 may be performed after assembling the upper and lower glass substrates and before attaching the upper and lower polarization layers. In this case, fine controlling the wave length and the power of laser is needed.

The laser may have an effect only on the λ/4 retardation layer but not on the thin film transistor array formed on the upper surface of the lower glass substrate 240 and color filter formed on the lower surface of the upper glass substrate 242. The laser may be any of krypton fluoride (KrF) excimer laser or argon fluoride (ArF) excimer laser having a short wavelength.

Figure 6A:
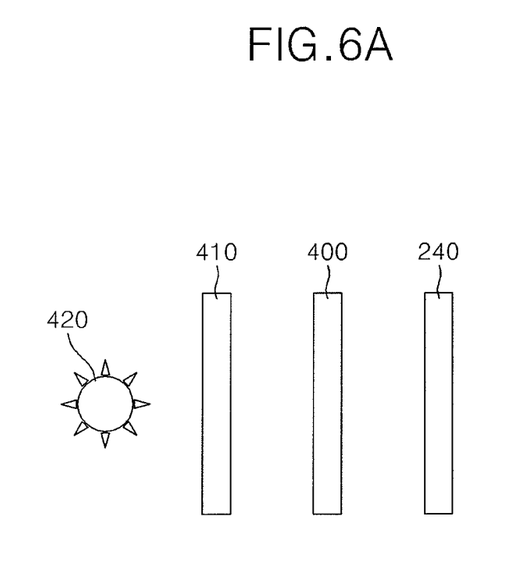
FIGS. 6A and 6B are schematic views illustrating a method of forming the light efficiency enhancer of FIG. 3 according to another exemplary embodiment of the present invention.
Figure 6B:
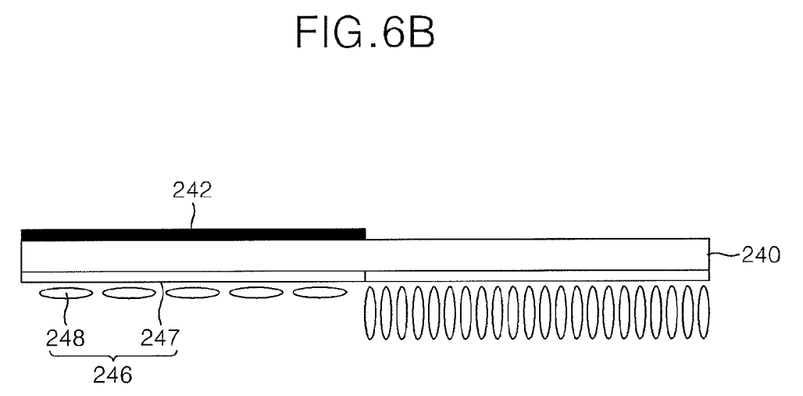

FIGS. 6A and 6B are schematic views illustrating a method of forming the light efficiency enhancer of the transflective LCD device of FIG. 3 according to another exemplary embodiment of the present invention.

Referring to FIGS. 6A and 6B, optical alignment is used to form the light efficiency enhancer 246 on a lower surface of the lower glass substrate 240. The process of forming the light efficiency enhancer 246 includes an alignment layer formation process and a liquid crystal layer formation process.

The optical alignment is a non-contact alignment technique using a linearly polarized ultraviolet exposure technique rather than a rubbing technique.

The alignment layer formation process is shown in FIG. 6A. In FIG. 6A, a polyimide polymer compound is coated on the lower surface of the lower glass substrate 240 using a spin coating technique or an alignment layer printing technique, and then hardened. After the polyimide polymer compound is coated, a mask 400 having a reflective region pattern is aligned below the lower glass substrate 240 such that the mask 400 faces the polyimide high polymer compound using an alignment key. After the mask 400 is aligned, an ultraviolet light 420 which is horizontally polarized is projected onto the mask 400 by a linear polarizer 410.

The alignment key may be formed of a gate pattern. The mask may be implemented such that the reflective region pattern passes through the polarized ultraviolet light 420 and the remaining portion corresponding to a transmissive region blocks the ultraviolet light 420. The polyimide polymer compound corresponding to the reflective region pattern of the mask 400 is horizontally aligned by the polarized ultraviolet light 420 and the polyimide polymer compound corresponding to a transmissive region is not aligned by blocking the ultraviolet light 420.

That is, the polyimide polymer compound coated on the lower surface of the lower glass substrate 240 is horizontally aligned by the polarized ultraviolet light 420 at an area corresponding to the reflective region.

The liquid crystal layer is formed as shown in FIG. 6B. In FIG. 6B, after forming an alignment layer 247 on a lower surface of the lower glass substrate 240, a liquid crystal layer is coated on the surface of the alignment layer 247 of the lower glass substrate 240 such that liquid crystal molecules 248 are aligned according to the alignment layer 247. In more detail, the liquid crystal layer is formed by coating a photo-polymerizable reactive liquid crystal on the surface of the alignment layer 247 using the spin coating or printing method.

The liquid crystal layer may also have a refractive index anisotropy ($\Delta n$) of about 0.1 and be horizontally aligned to retard the phase of light by λ/4 with a thickness of about 1 μm. In this case, the liquid crystal molecules 248 of the liquid crystal layer is horizontally aligned (homogeneous alignment) at the reflective region and vertically aligned (homeotropic alignment) at the transmissive region. If the ultraviolet light is projected onto the liquid crystal layer, the liquid crystal molecules 248 undergoes the photo-polymerization reaction while maintaining their aligned states on the alignment layer 247 to be hardened. Accordingly, the light efficiency enhancer 246 of a solid state film is formed at the reflective region.

The light efficiency enhancer 246 retards the phase of light passing through the reflective region by λ/4.

As described above, a transflective LCD device according to an embodiment of the present invention is provided with a light efficiency enhancer for retarding the phase of light passing through the lower glass substrate having the thin film transistor array by λ/4, thereby improving light efficiency.

While the invention has been shown and described with reference to embodiments thereof, it will be understood by those skilled in the art that various changes in form and details may be made therein without departing from the spirit and scope of the invention as defined by the appended claims.

What is claimed is:

1. A method of fabricating a transflective liquid crystal display device including a thin film transistor substrate having a transmissive region and a reflective region, the method comprising:

forming a retardation layer on a lower surface of the thin film transistor substrate;

aligning a mask having a reflective region pattern on the lower surface of the thin film transistor substrate; and forming a light efficiency enhancer by selectively removing the retardation layer by irradiating a laser onto the lower surface of the thin film transistor substrate through the mask.

2. The method of claim 1, wherein the retardation layer has a λ/4 phase retardation characteristic.

3. The method of claim 1, wherein the mask is aligned using an alignment key formed of a gate pattern.

4. The method of claim 1, wherein the mask has the reflective region pattern blocking the laser at an area corresponding to the reflective region and transmitting the laser at an area corresponding to the transmissive region.

5. The method of claim 1, wherein the laser is a krypton fluoride (KrF) laser or an argon fluoride (ArF) laser.

6. A method of fabricating a transflective liquid crystal display device including a thin film transistor substrate having a transmissive region and a reflective region, the method comprising:

coating an optical alignment compound on a lower surface of the thin film transistor substrate;

forming an optical alignment layer by optically aligning the optical alignment compound at the reflective region;

coating a photo-polymerizable reactive liquid crystal reacting to an ultraviolet light on the optical alignment layer; and forming a light efficiency enhancer by hardening the liquid crystal.

7. The method of claim 6, wherein the optical alignment compound is a polyimide polymer compound.

8. The method of claim 7, wherein forming an optical alignment layer comprises:

aligning a mask having a reflective region pattern on the optical alignment compound;

aligning a linear polarizer on the mask; and projecting an ultraviolet light onto the optical alignment compound through the linear polarizer and the mask.

9. The method of claim 8, wherein the mask exposes the optical alignment compound to the ultraviolet light at the reflective region and blocks the ultraviolet light at the transmissive region.

10. The method of claim 6, wherein the liquid crystal layer is horizontally aligned to retard a phase of light by λ/4 at the reflective region.

11. The method of claim 10, wherein the photo-polymerizable reactive liquid crystal is coated using a spin coating technique or a printing technique.

12. The method of claim 11, wherein the light efficiency enhancer is formed by hardening the photo-polymerizable reactive liquid crystal while liquid crystal molecules are aligned in accordance with the optical alignment layer.

13. A transflective liquid crystal display device including a thin film transistor substrate having a transmissive region and a reflective region, comprising:

lower and upper polarization layers each having a horizontal optical axis;

a backlight reflector for reflecting incident light to the lower polarization layer;

lower and upper retardation plates positioned between the lower and upper polarization layers, each retarding a phase of incident light by λ/4;

lower and upper glass substrates positioned between the lower and upper retardation plates, wherein the lower and upper glass substrates are assembled while maintaining a gap;

a liquid crystal layer disposed in the gap;

a reflector formed on the lower glass substrate at the reflective region; and a light efficiency enhancer formed between the lower glass substrate and the lower retardation plate to retard a phase of incident light by λ/4.

14. The transflective liquid crystal display device of claim 13, wherein the light efficiency enhancer is formed at the reflective region not at the transmissive region.

* * * * *